April 7, 1959 A. H. BRODBECK 2,880,716
COOKING RANGE
Filed Jan. 16, 1956 2 Sheets-Sheet 1

Almer H. Brodbeck,
Inventor.
Koenig and Pope,
Attorneys.

April 7, 1959  A. H. BRODBECK  2,880,716
COOKING RANGE
Filed Jan. 16, 1956  2 Sheets-Sheet 2
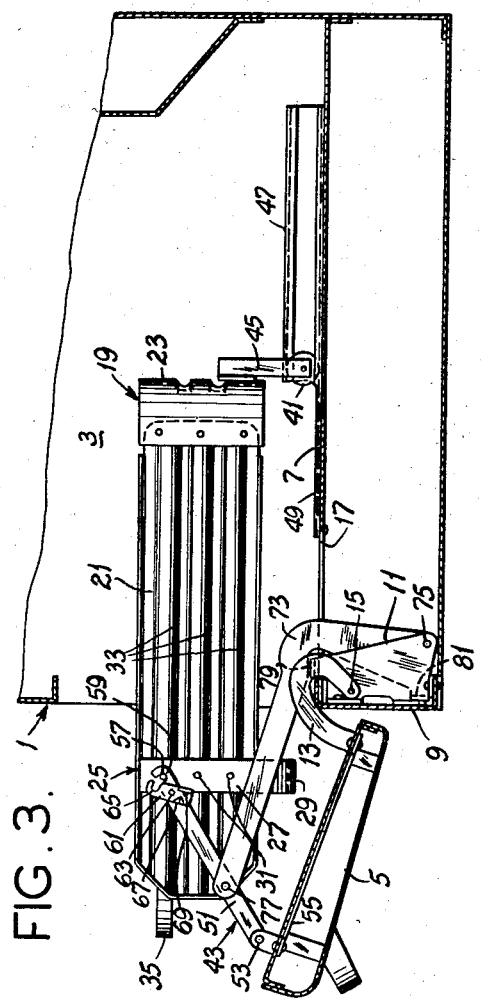
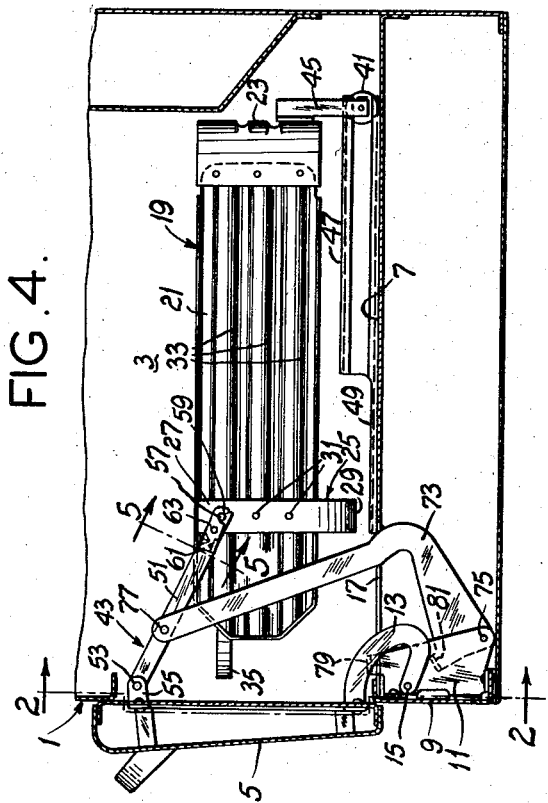
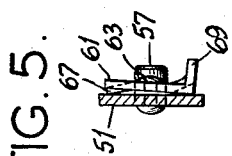
Almer H. Brodbeck,
Inventor.
Koenig and Pope,
Attorneys.

United States Patent Office 2,880,716
Patented Apr. 7, 1959

2,880,716

COOKING RANGE

Almer H. Brodbeck, St. Louis, Mo., assignor, by mesne assignments, to Dixie Products, Inc.

Application January 16, 1956, Serial No. 559,174

6 Claims. (Cl. 126—41)

This invention relates to cooking ranges, and more particularly to a broiler construction for a cooking range.

Among the several objects of the invention may be noted the provision of an improved broiler construction for a cooking range of the type having a rack for the broiler pan which is movable forward from a retracted position in the broiler chamber to an extended position projecting out of the chamber on opening the broiler door and returned to retracted position on closing the broiler door, wherein the rack is supported in such manner as to avoid the possibility of becoming jammed in the broiler chamber, or difficult to move; the provision of a broiler construction of the class described in which the rack remains substantially horizontal throughout its range of movement and in which the rack, when in extended position, projects out of the chamber a maximum distance; the provision of a broiler construction of the class described in which the rack is readily removable from the range for cleaning; and the provision of a broiler construction having the stated features which is economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan view illustrating a broiler construction of this invention, showing the broiler door open and the rack in extended position;

Fig. 3 is a vertical section taken on line 3—3 of Fig. 1;

Fig. 4 is a view similar to Fig. 3 showing the broiler door closed and the rack in retracted position; and, Fig. 5 is an enlarged section taken on line 5—5 of Fig. 4.

Corresponding reference characters indicate corresponding parts throughout the several views of the drawings.

Figure 1:
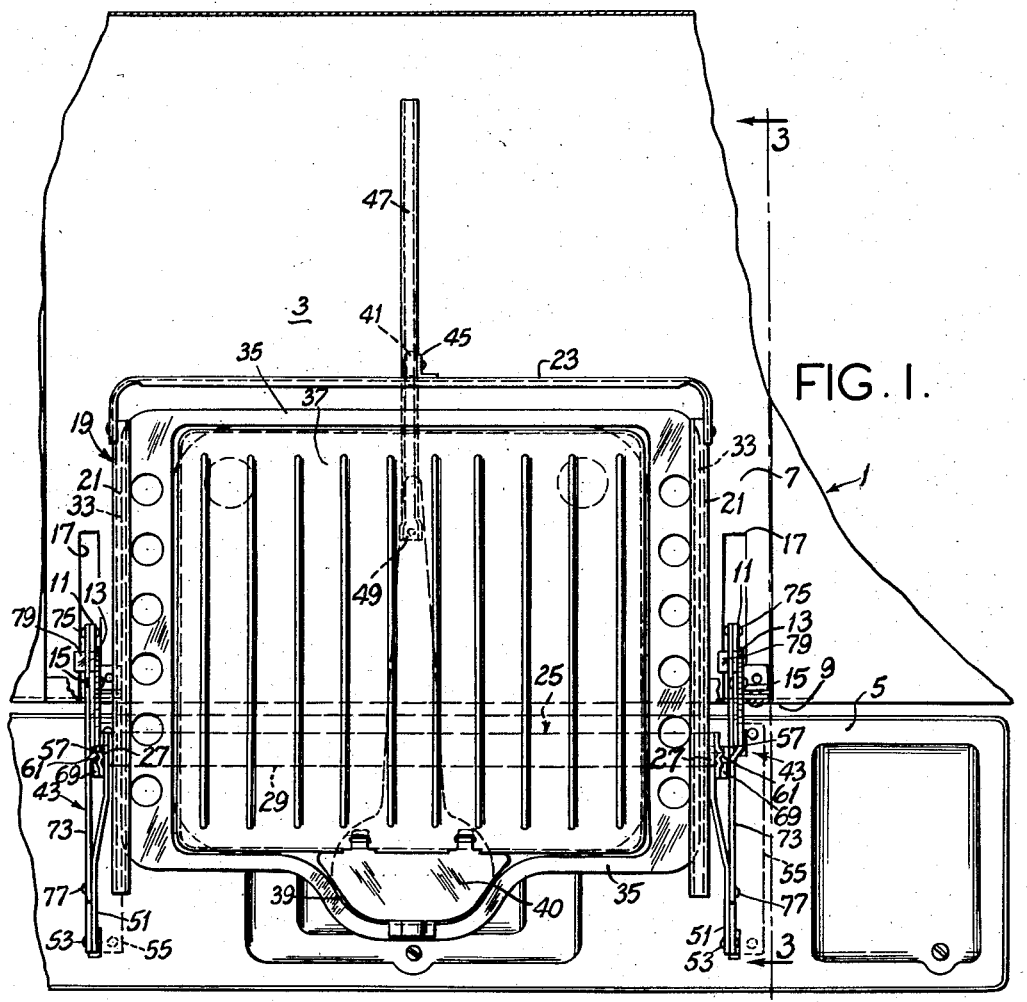
Figure 2:
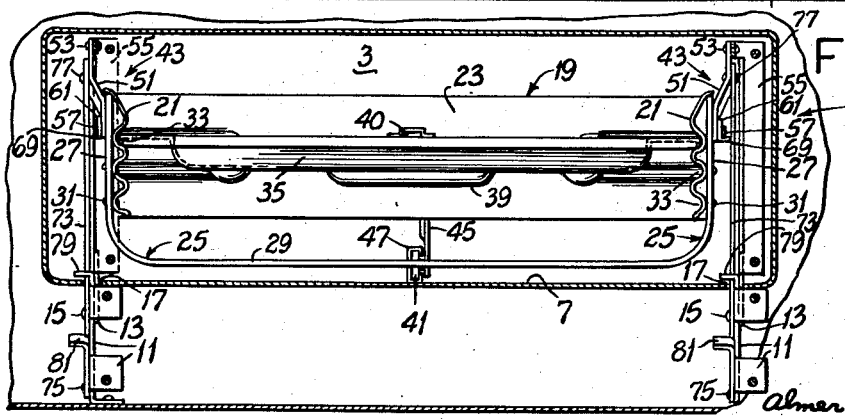
Fig. 2 is a cross section taken on line 2—2 of Fig. 4.

Referring to the drawings, there is indicated at 1 a cooking range having a broiler chamber 3 and a door 5 for the broiler chamber. The broiler chamber has a sheet metal bottom 7. The range has a front panel 9 below the broiler bottom. Hinge brackets 11 are secured to the inside of panel 9. Curved hinge arms 13 extend from the door to pin connections at 15 with the brackets 11 for pivotally mounting the door for swinging movement on a horizontal axis adjacent the bottom of the door between the closed position illustrated in Fig. 4 extending vertically upward and the open position illustrated in Fig. 3 extending forward from the range. The arms 13 are located adjacent the sides of the door. The bottom 7 has openings 17 for passage of the arms.

A broiler rack generally designated 19 is connected to the door to be moved outward from the retracted position in the chamber 3 shown in Fig. 4 on opening the door to the extended position projecting out of the chamber shown in Figs. 1 and 3, and to be returned to retracted position on closing the door. The rack 19 comprises side walls 21, a back wall 23, and a U-shaped brace 25 for the side walls adjacent their forward ends. It is open at the front. The sides of the brace are designated 27 and its base portion is designated 29. The sides 27 of the brace extend upward from the base portion on the outside of the side walls 21 of the rack and are secured thereto as indicated at 31. The side walls 21 are horizontally corrugated to provide grooves 33 for accepting a broiler pan 35 at various heights. The pan is slidable into and out of the rack between the side walls from the open front of the rack. A broiler grid 37 is shown in the pan. The pan has a well 39 at its forward end. A cover 40 for the well is pivotally mounted at the forward end of the grid.

The rack 19 is supported in generally horizontal position above the bottom of the broiler chamber by means including a single central roller 41 at the rearward end of the rack and two linkages each generally designated 43 at the sides of the rack at its forward end. The roller 41 is mounted at the lower end of a support constituted by a bracket 45 which extends down from the back wall 23 of the carriage. It rolls on the bottom of the chamber, preferably being guided in a track 47 of C-shape in cross section secured in upright position on the bottom of the chamber extending in front-to-rear direction in the central front-to-rear vertical plane of the chamber. The C-shaped track section 47 extends from near the rear of the bottom 7 approximately to the center of the bottom. The bottom portion of the track is extended toward the front of the chamber, as indicated at 49.

Each linkage 43 comprises a link 51 having a pin connection 53 at one end (its forward end) with a bracket 55 on the inside of the door adjacent the upper edge of the door, and having its rearward end detachably connected to a pin 57 which projects outward from the respective side 27 of the brace 25. The detachable connection is formed by providing a notch 59 in the link 51 at its rearward end for receiving the pin 57, and a latch 61 pivoted at 63 on the outside of the link, said latch having a notch 65 for receiving the pin. The latch 61 has an inward offset 67 at its upper edge (see Fig. 5) engageable with the link to hold the latch in its latching position illustrated in Fig. 4, and an outwardly extending thumb piece 69 at its lower edge. Each linkage 43 further comprises an L-shaped arm 73 having a pin connection 75 at one end (its lower end) with a respective bracket 11 and a pin connection 77 at its upper end with the respective link 51. The L-shaped arms 73 are adapted to engage upper stop lugs 79 on the brackets 11 for limiting the outward swing of the door and the outward movement of the broiler rack, as will be made clear. The arms 73 also have stop lugs 81.

Operation is as follows:

With the door 5 closed, the rack 19 occupies the retracted position in the broiler chamber 3 shown in Fig. 4. In this position of the rack, the roller 41 is located at the rearward end of the track 47. The links 51 are inclined upward from the pivots 57 to the pivots 53. The arms 73 are located in an upwardly extending position and prevent the forward end of the rack from tilting downward under its own weight.

Upon opening the door, the links 51 act to pull the rack 19 forward. The arms 73 swing counter-clockwise as viewed in Fig. 4 on their pivots 75 until stopped by the lugs 79 on the brackets 11. This determines open position of the door illustrated in Figs. 1 and 3 and the extended position of the rack. The arms 73 act to maintain the forward end of the rack raised above the bottom 7 of the broiler chamber as the rack moves forward, and the rack is maintained generally horizontal throughout its range of movement. The roller 41 moves forward from the rearward end of the track 47 to the forward end of the track. The track holds the roller (and hence the rearward end of the rack) against upward movement. Upon closing the door, the parts return to the position illustrated in Fig. 4.

It will be observed that the rack is supported at only three points: at the pivots 57 and at the center of its rearward end. This three-point support is such as to avoid the possibility of the rack becoming jammed against movement or difficult to move. With the pivots 75 for arms 73 below the broiler bottom, as shown, it is possible to provide for a maximum projection of the rack from the broiler chamber when the door is opened.

The rack 19 may be readily removed for cleaning by releasing the latches 61 and disengaging the links 51 from the rack. This permits the rack readily to be pulled forward out of the chamber, the roller 41 being disengageable from the track 47 by coming out of its forward end.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a cooking range having a broiler chamber, a door for the front of the chamber pivoted on a horizontal axis adjacent the lower edge of the door for swinging movement between a closed position extending vertically upward and an open position extending forward, a broiler rack movable forward from a retracted position in the chamber to an extended position projecting out of the chamber, said rack being supported in generally horizontal position above the bottom of the chamber by roller means at the rear of the rack and by linkages at opposite sides of the rack at the front of the rack, each of said linkages including a link connected at one end to the door adjacent the upper edge of the door and at its other end directly to the rack, and an arm pivotally connected at one end to the range and pivotally connected at its other end to the link at a point intermediate the ends of the link, said links being inclined downward from the door to the rack when the door is in closed position and inclined upward from the door to the rack when the door is in open position, said links acting when the door is opened to pull the rack forward to its extended position and said arms acting to maintain the forward end of the rack raised above the bottom of the chamber as the rack moves forward.

2. In a cooking range having a broiler chamber, a door for the front of the chamber pivoted on a horizontal axis adjacent the lower edge of the door for swinging movement between a closed position extending vertically upward and an open position extending forward, a broiler rack movable forward from a retracted position in the chamber to an extended position projecting out of the chamber, said rack being supported in generally horizontal position above the bottom of the chamber by means of a support extending down from the rack at the rear of the rack and located substantially centrally of the rear of the rack, said support having a roller at its lower end riding on the bottom of the chamber, and said rack being supported at the front by linkages at opposite sides thereof, each of said linkages including a link connected at one end to the door adjacent the upper edge of the door and at its other end directly to the respective side of the rack, and an arm pivotally connected at one end to the range and pivotally connected at its other end to the link at a point intermediate the ends of the link, said links being inclined downward from the door to the rack when the door is in closed position and inclined upward from the door to the rack when the door is in open position, said links acting when the door is opened to pull the rack forward to its extended position and said arms acting to maintain the forward end of the rack raised above the bottom of the chamber as the rack moves forward.

3. In a cooking range as set forth in claim 2, the links being detachably connected at their said other ends to the sides of the rack.

4. In a cooking range as set forth in claim 2, said arms being pivotally connected to the range below the bottom of the broiler chamber and extending through openings in the broiler bottom.

5. In a cooking range as set forth in claim 2, the bottom of the broiler chamber having a track thereon for guiding the roller and holding it against upward movement.

6. In a cooking range as set forth in claim 2, the links being detachably connected at their said other ends to the sides of the rack, and the bottom of the broiler chamber having a track thereon for guiding the roller and holding it against upward movement, said roller being disengageable from the track when the links are disconnected from the rack for removal of the rack from the broiler chamber.

References Cited in the file of this patent

UNITED STATES PATENTS

| | | |
|---|---|---|
| 1,740,505 | Groak | Dec. 24, 1929 |
| 1,851,855 | Lindemann et al. | Mar. 29, 1932 |
| 2,088,719 | Pierson | Aug. 3, 1937 |
| 2,139,989 | Weiskittel | Dec. 13, 1938 |
| 2,296,950 | Roedl | Sept. 29, 1942 |
| 2,532,445 | Haberstump | Dec. 5, 1950 |